(12) United States Patent
Murayama

(10) Patent No.: US 6,728,993 B1
(45) Date of Patent: May 4, 2004

(54) STRUCTURE FOR PIVOTALLY SUPPORTING CHECK PLATE OF DOOR CHECKER

(75) Inventor: Yuji Murayama, Saitama (JP)

(73) Assignee: Rikenkaki Kogyo Kabushiki Kaisha, Saitama (JP)

( * ) Notice: Subject to any disclaimer, the term of this patent is extended or adjusted under 35 U.S.C. 154(b) by 15 days.

(21) Appl. No.: 10/291,746

(22) Filed: Nov. 12, 2002

(51) Int. Cl.[7] .............................. B60J 5/04; E05C 17/22; F16C 11/04
(52) U.S. Cl. ..................... 16/342; 16/82; 296/146.11
(58) Field of Search ................................ 16/86 C, 342, 16/82, 303, 319, 321, 337, 341, 375, 376; 296/146.11

(56) References Cited

U.S. PATENT DOCUMENTS

| | | | |
|---|---|---|---|
| 5,109,572 A | * 5/1992 | Park | 16/334 |
| 5,613,275 A | * 3/1997 | Kolberg et al. | 16/441 |
| 6,154,927 A | * 12/2000 | Oi et al. | 16/386 |
| 6,481,056 B1 | * 11/2002 | Jesse | 16/334 |
| 6,601,268 B2 | * 8/2003 | Seo | 16/334 |

FOREIGN PATENT DOCUMENTS

| | | | |
|---|---|---|---|
| DE | 196 32 331 | * | 2/1996 |
| JP | 10-18670 | | 1/1998 |
| JP | 2003-72373 | * | 3/2003 |
| JP | 2003-118369 | * | 4/2003 |

* cited by examiner

*Primary Examiner*—Gary S. Hartmann
(74) *Attorney, Agent, or Firm*—Arent Fox PLLC

(57) ABSTRACT

In a check plate supporting structure, a check plate of a door checker interposed between a door support and a door supported on the door support is turnably supported on a bracket mounted to the door support. A pivot secured to the bracket is relatively turnably press-fitted into a polygonal bearing bore defined in the check plate. Large numbers of pressure-contact portions and gaps are alternately arranged between an inner peripheral surface of the bearing bore and an outer peripheral surface of the pivot in circumferential directions thereof. Thus, the looseness between the pivot secured to the bracket and the bearing bore in the check plate can be eliminated without excessive increase in turning torque of the check plate relative to the bracket, thereby preventing generation of an abnormal sound during opening and closing of the door and facilitating manual mounting of the door checker to the door support.

3 Claims, 7 Drawing Sheets

STRUCTURE FOR PIVOTALLY SUPPORTING CHECK PLATE OF DOOR CHECKER

BACKGROUND OF THE INVENTION

1. Field of the Invention

The present invention relates to a door checker interposed between a door support and a door supported on the door support to control the torque for opening and closing the door and to retain the door in a position with a predetermined opening degree, and particularly to an improvement in a structure for pivotally supporting a check plate of a door checker, in which the check plate is turnably supported on a bracket mounted to a door support without looseness.

2. Description of the Related Art

There is a conventional check plate supporting structure, wherein in order to ensure that the check plate is turnably supported on the bracket mounted to the door support without looseness, a bush made of a synthetic resin is fitted into a support bore provided in the check plate; a tapered shaft portion of a pivot secured to the bracket is relatively turnably fitted into a tapered bearing bore in the bush; and a resilient flange adapted to repulse the bush axially to eliminate the looseness between the bush and the pivot is connected to the bush, as disclosed in, for example, Japanese Patent Application Laid-open No.10-18670.

In the conventional check plate supporting structure, a special expensive bush is required, so that it is difficult to reduce the cost.

One example of a simple technique for eliminating the looseness between the pivot secured to the bracket and the bearing bore defined in the check plate is to press-fit the pivot into the bearing bore for relative rotation. With such a press-fitting technique, however, the turning torque of the check plate relative to the bracket is too large, thereby making difficult the manual mounting of the door checker between the door support and the door.

SUMMARY OF THE INVENTION

Accordingly, it is an object of the present invention to provide a structure for pivotally supporting a check plate of a door checker, wherein the looseness between the pivot secured to the bracket and the bearing bore defined in the check plate can be eliminated without use of a conventional special bush and without excessive increase in turning torque of the check plate relative to the bracket, thereby preventing generation of an abnormal sound during opening and closing of the door.

To achieve the above object, according to a first feature of the present invention, there is provided a structure for pivotally supporting a check plate of a door checker interposed between a door support and a door supported on the door support, the check plate being turnably supported on a bracket mounted to the door support, wherein a pivot secured to the bracket is relatively turnably press-fitted into a polygonal bearing bore defined in the check plate, and large numbers of pressure-contact portions and gaps are alternately arranged in circumferential directions thereof between an inner peripheral surface of the bearing bore and an outer peripheral surface of the pivot.

The door support corresponds to a body B of an automobile in an embodiment of the present invention, which will be described hereinafter.

With the first feature, the press-fitting of the pivot in the bearing bore ensures that the looseness between the pivot and the bearing bore can be eliminated to prevent an abnormal sound during opening and closing of a door. Moreover, the large numbers of pressure-contact portions and gaps are alternately arranged in the circumferential directions thereof between the inner peripheral surface of the bearing bore and the outer peripheral surface of the pivot, so that when the pressure-contact portions receive a compression load, the gaps adjoining opposite sides of each of the pressure-contact portions permit the resilient deformation of such pressure-contact portions, thereby effectively absorbing the shock of the load. This can contribute to an enhancement in durability of each of the bearing bore, the pivot and the bracket.

Further, it is possible to set the turning torque of the check plate at a relatively small value, while forming by the provision of the gaps the good pressure-contact portions in virtue of a relatively small load for press-fitting the pivot into the bearing bore, and to facilitate manual mounting of the door checker.

Yet further, a special bush is not required and the structure is extremely simple, which can greatly contribute to a reduction in cost.

According to a second feature of the present invention, in addition to the first feature, at least a bearing portion of the check plate, which defines the bearing bore, is made of a synthetic resin.

With the second feature, the bearing portion is made of the synthetic resin, and hence the resilient deformation of the pressure-contact portions occurs easily to effectively achieve both of a reduction in turning torque of the check plate and the elimination of the looseness from around the pivot.

According to a third feature of the present invention, in addition to the second feature, the check plate comprises a plate body made of a metal, and a cover member made of a synthetic resin and mold-coupled to the plate body to cover the plate body, and the bearing portion in close contact with an inner peripheral surface of a through-bore provided in the plate body is integrally connected to the cover member.

With the third feature, the bearing portion made of the synthetic resin can be reinforced by the plate body leading to an enhancement in durability of the bearing portion, and the structure can be simplified by forming the bearing portion integrally with the cover member.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
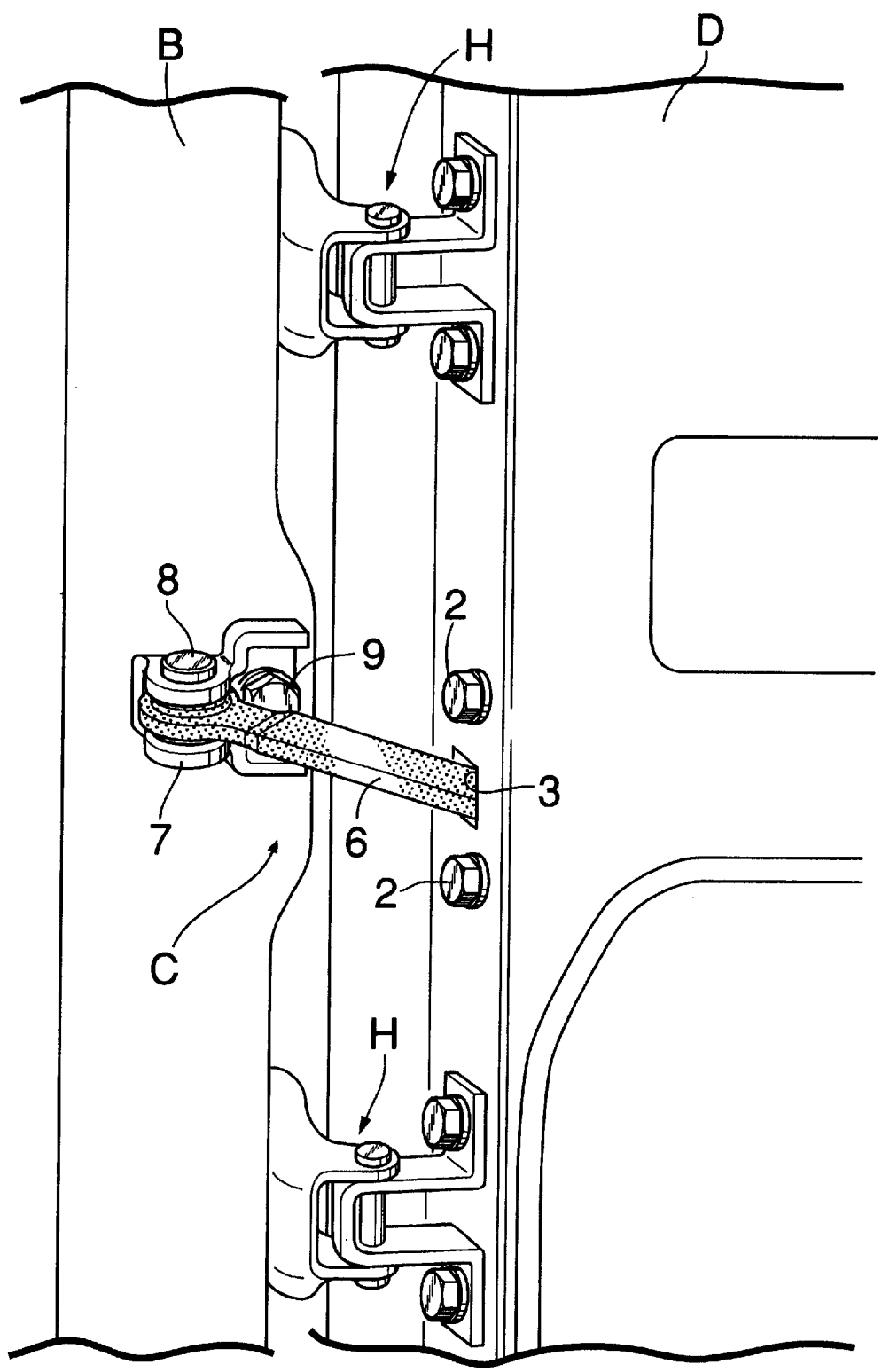
FIG. 1 is a perspective view of an essential portion of an automobile having a door checker according to the present invention mounted thereto.

Referring first to FIG. 1, a door D is turnably mounted to a body B of an automobile through a pair of upper and lower hinges H, H to open and close a doorway in the body. A door checker C according to the present invention is mounted to the body B and the door D between both the hinges H, H.

Figure 2:
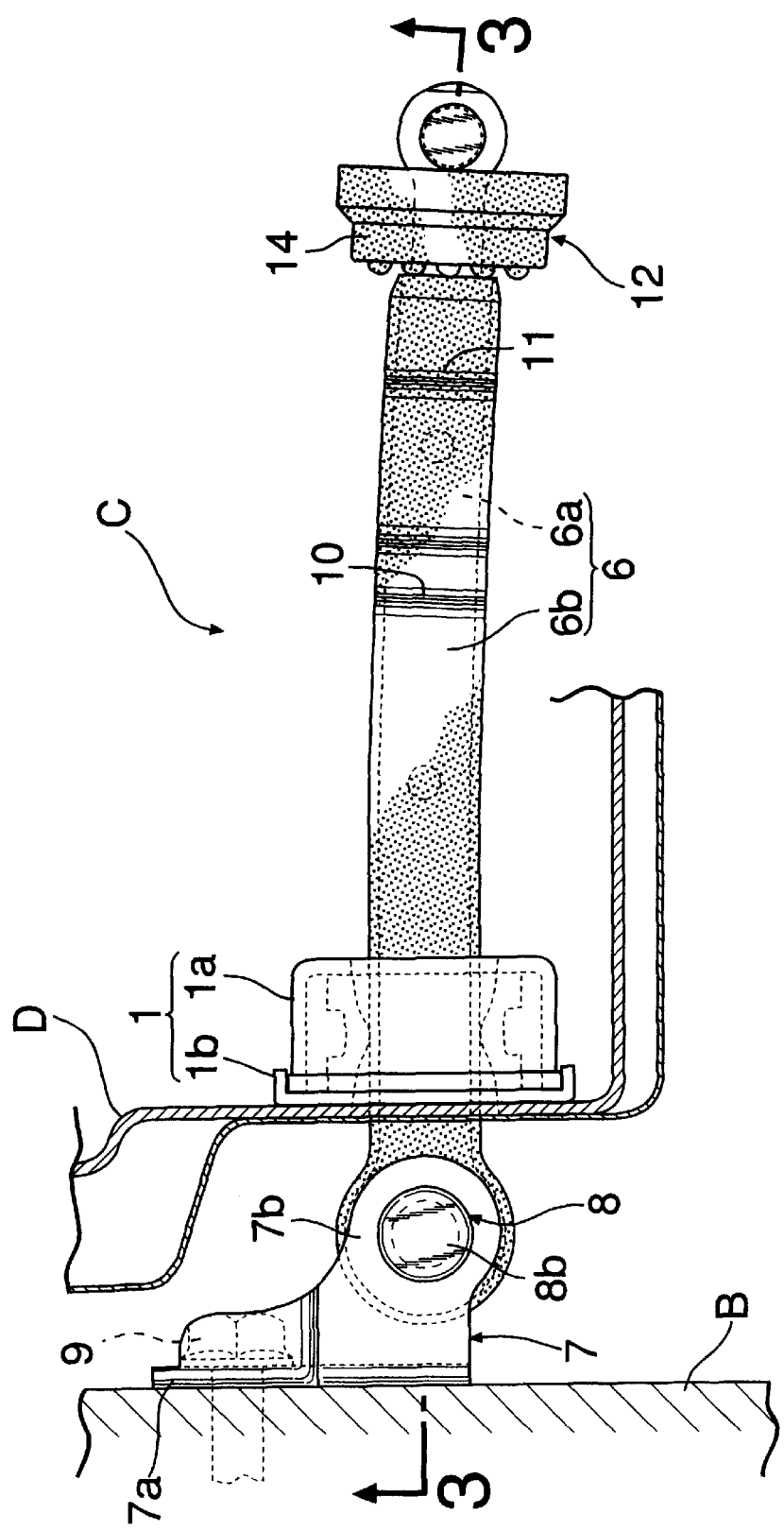
FIG. 2 is a plan view of the door checker.
Figure 3:
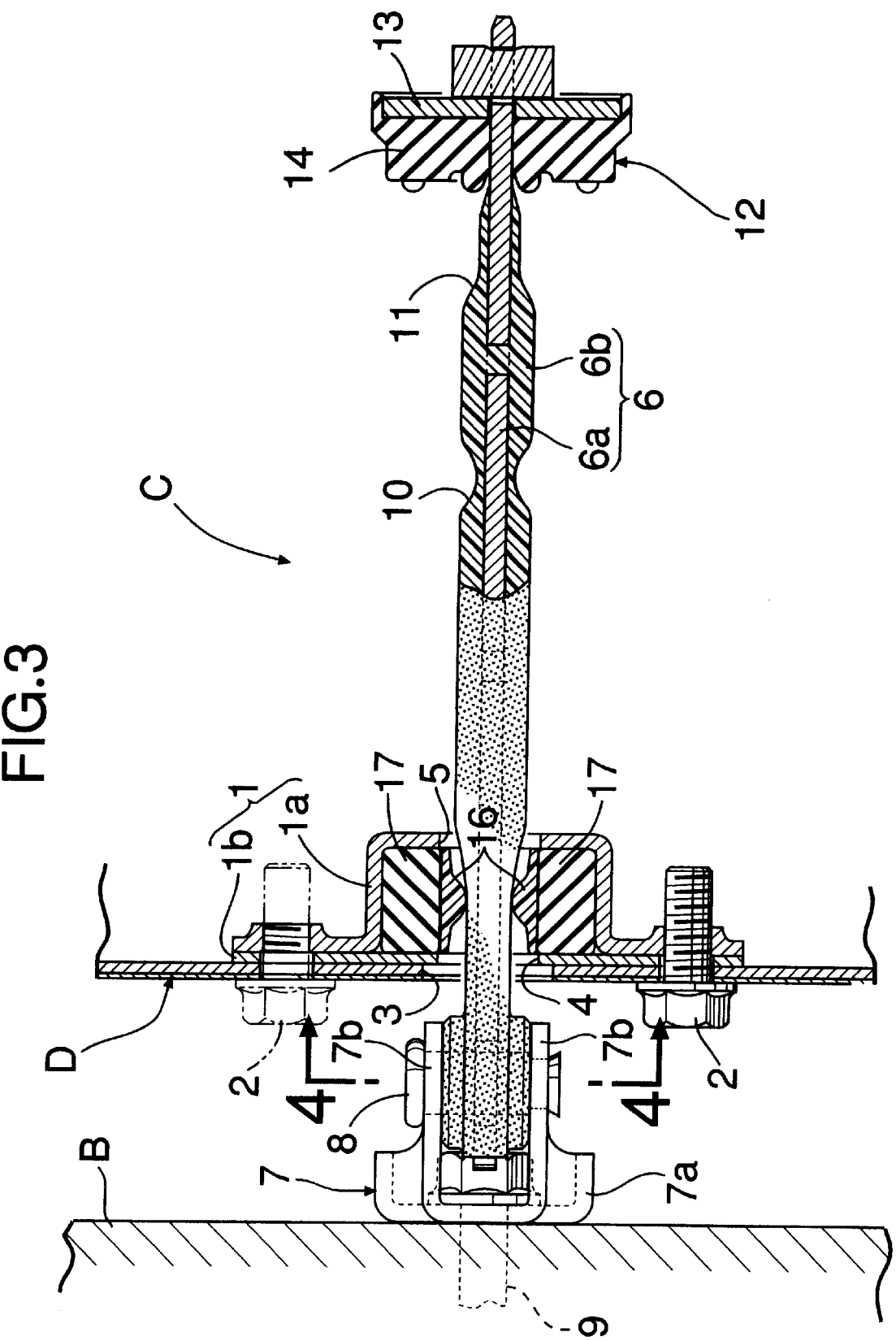
FIG. 3 is a sectional view taken along a line 3—3 in FIG. 2.

As shown in FIGS. 1 to 3, the door checker C includes a case 1 secured to an inner surface of an end wall of the door D by bolts 2. The case 1 comprises a box-shaped case body 1a with one end opened, and a cover 1b clamped between the case body 1a and the inner surface of the end wall of the door D, while covering the opened end. Through-bores 4 and 5 are provided in the cover 1b and the case body 1a and arranged coaxially with a through-bore 3 which opens into the end wall of the door D. A check 6 extending through the three through-bores 3, 4 and 5 is relatively turnably connected at its base end to a bracket 7 through a pivot 8. The bracket 7 is secured to the body D by a bolt 9 with the pivot 8 disposed in parallel to a pivot of the hinge H.

The check plate 6 comprises a plate body 6a made of a steel plate and connected directly to the bracket 7, and a cover member 6b made of a synthetic resin and mold-coupled to a peripheral surface of the plate body 6a excluding a tip end thereof. The cover member 6b is formed so that the wall thickness of the check plate 6 is gradually increased from its base end to its tip end, and first and second notches 10, 10; 11, 11 are formed in a thicknesswise opposite side faces of the cover member 6b at intermediate locations and at locations closer to the tip end.

A full-opening stopper 12 for defining a limit of opening of the door D is mounted at the tip end of the plate body 6a exposed from the cover member 6b to face bottoms of the second notches 11, 11. The full-opening stopper 12 comprises a stopper metal piece 13 secured to the plate body 6a, and a rubber cushion 14 fitted over the stopper metal piece 13 and facing the second notches 11, 11.

As shown in FIG. 3, accommodated in the case 1 are a pair of shoes 16, 16 made of a synthetic resin and disposed to sandwich the check plate 6 in a direction of thickness of the check plate 6, and resilient means, i.e., a pair of rubber springs 17, 17 for repulsing the shoes 16, 16 to bring them into pressure contact with opposite side faces of the check plate 6, respectively.

Figure 4:
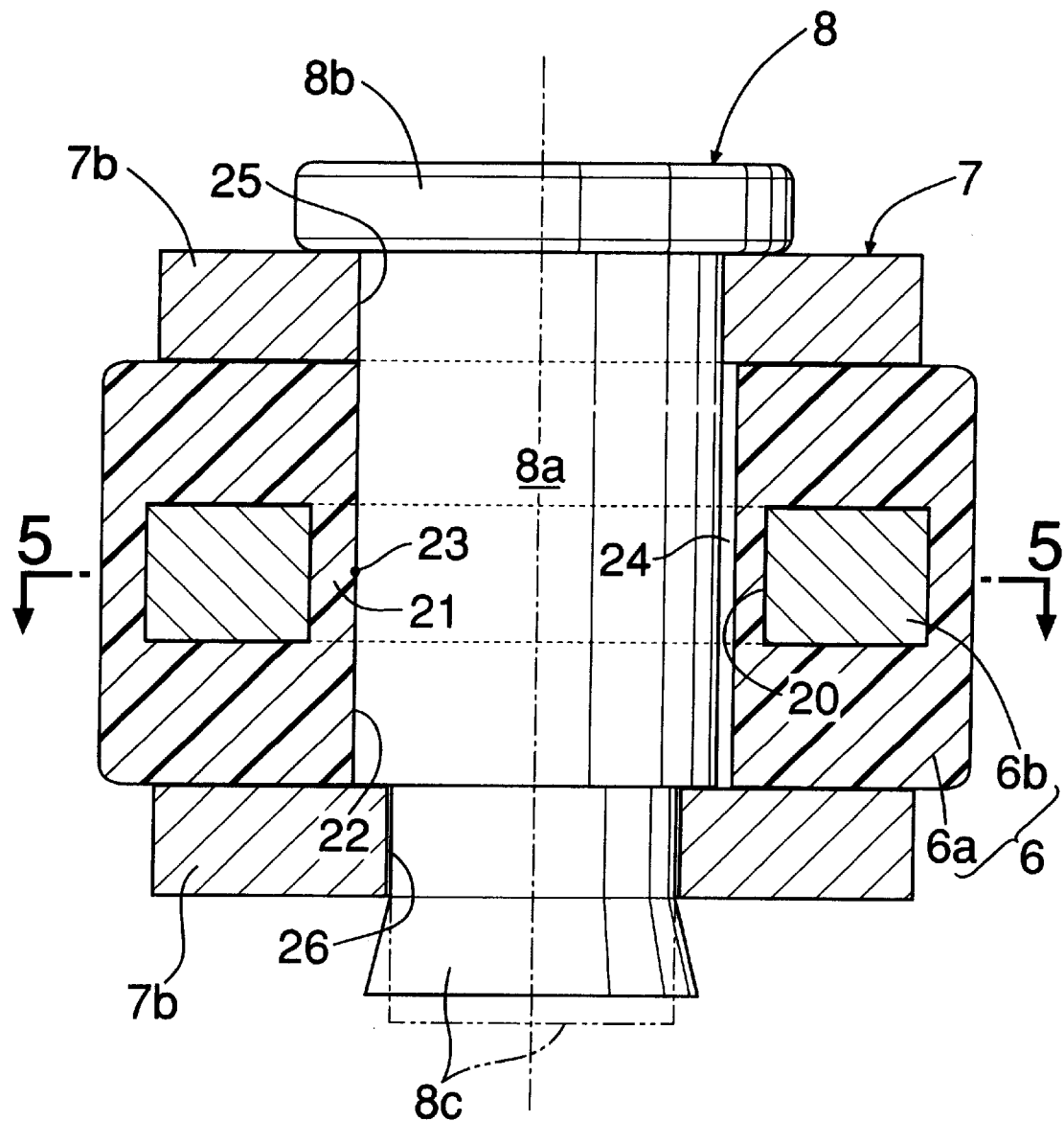
FIG. 4 is an enlarged sectional view taken along a line 4—4 in FIG. 3.
Figure 5:
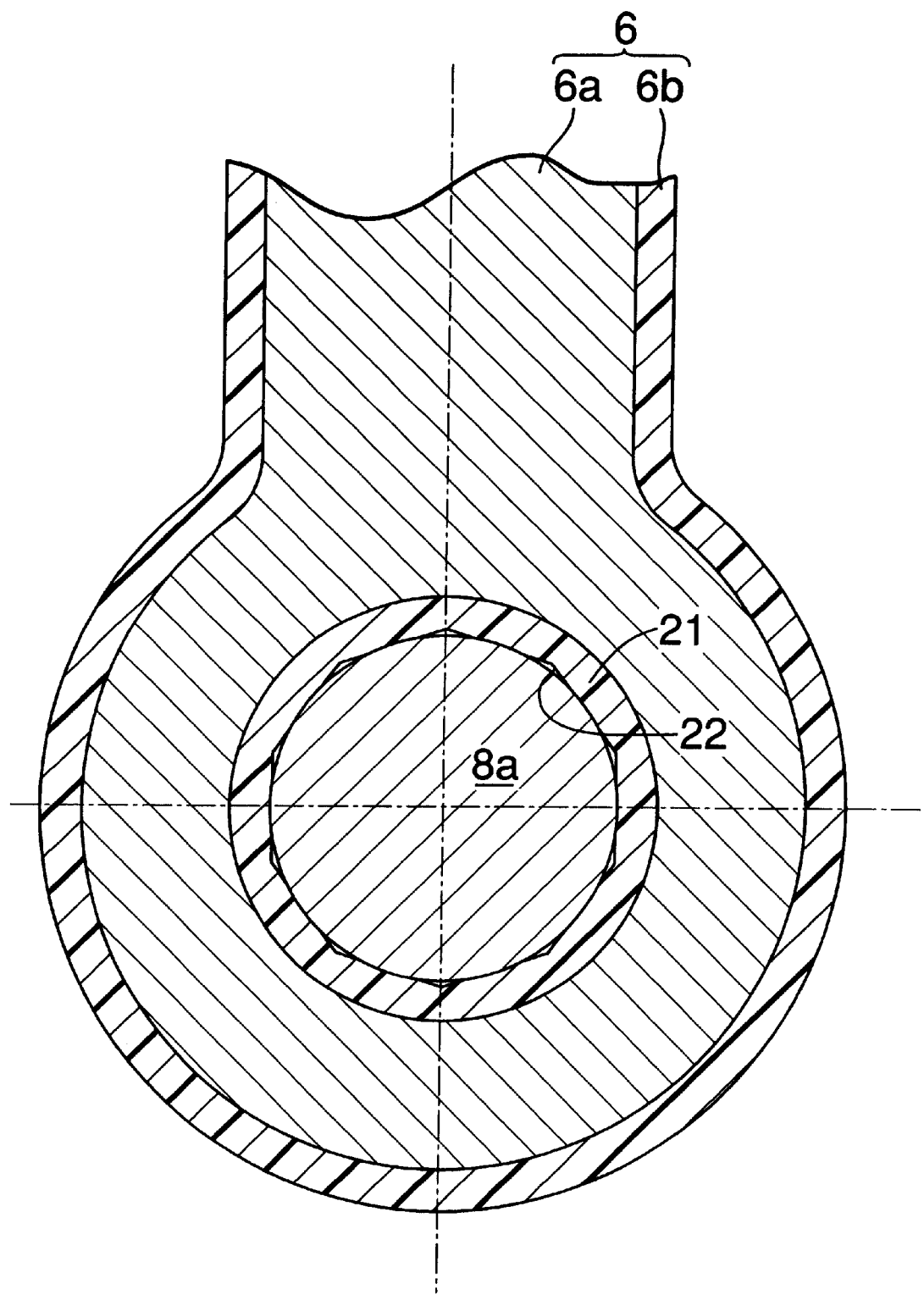
FIG. 5 is a sectional view taken along a line 5—5 in FIG. 4.
Figure 6:
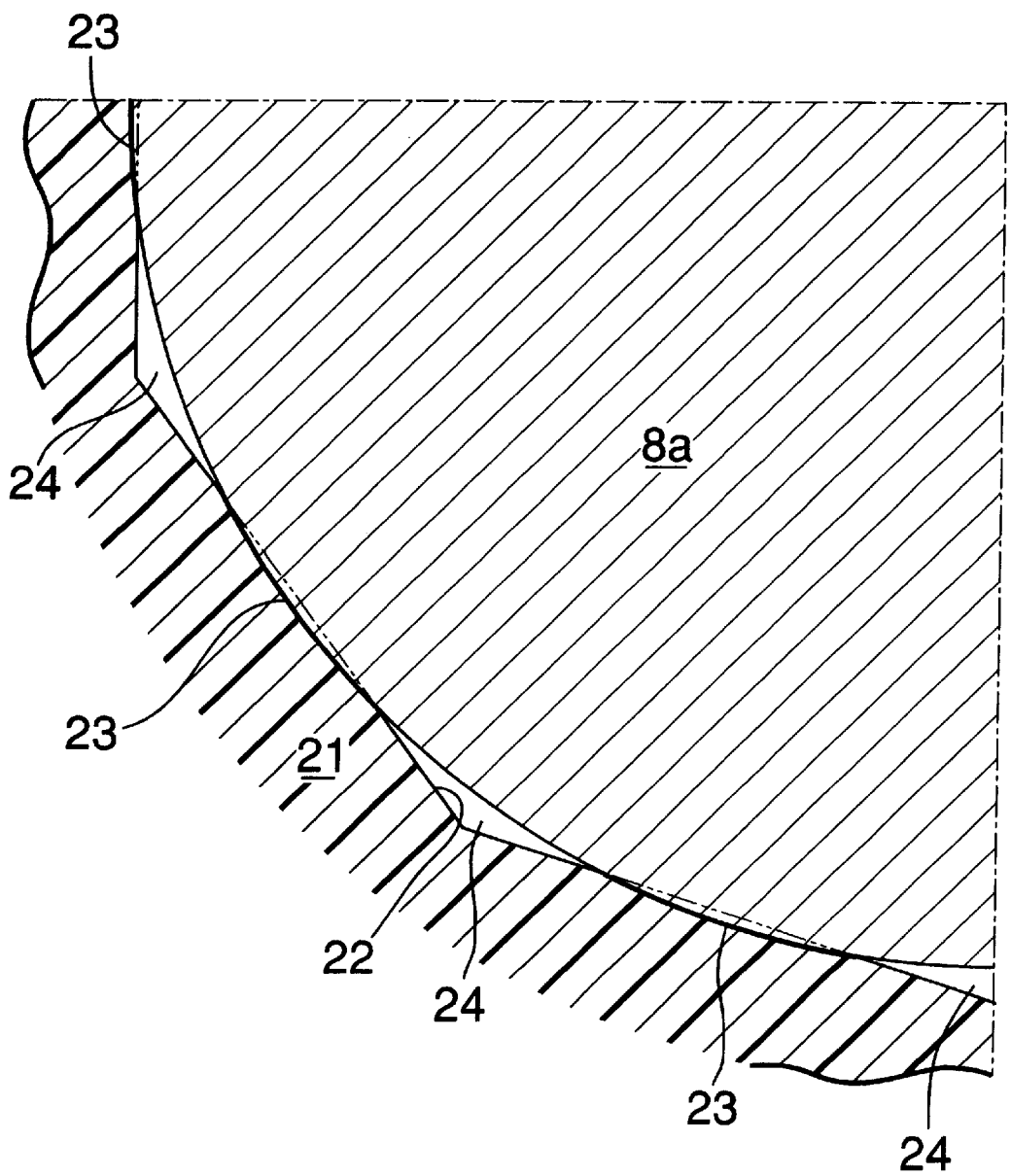
FIG. 6 is an enlarged view of an essential portion of FIG. 5.

A structure of supporting the check plate 6 at the bracket 7 will now be described with reference to FIGS. 4 to 6.

A through-bore 20 is provided in the plate body 6a at the base end of the check plate 6, and a bearing portion 21 made of a synthetic resin is mold-coupled in close contact with an inner peripheral surface of the through-bore 20 and integrally connected to the cover member 6b. More specifically, the bearing portion 21 is formed simultaneously with the formation of the cover member 6b, and when the bearing portion 21 is formed, a polygonal bearing bore 22 is formed in the bearing portion 21 by a forming die. A main shaft portion 8a of the pivot 8 made of a steel material and having a circular section, is relatively rotatably press-fitted into the bearing bore 22. For the purpose of such press-fitting, it goes without saying that the bearing bore 22 is required to be formed so that the inscribing circle of the polygonal bore has a diameter which is equal to or slightly smaller than the diameter of the main shaft portion 8a. As a result of the press-fitting, large numbers of pressure-contact portions 23 and gaps 24 are alternately provided between an inner peripheral surface of the polygonal bearing bore 22 and an outer peripheral surface of the pivot 8 in circumferential directions thereof.

The gaps 24 permit the resilient deformation of the bearing portion 21 at the pressure-contact portions 23. The large number of pressure-contact portions 23can be formed with a relatively small press-fitting load so that the inner peripheral surface of the bearing bore 21 and the pivot 8 are reliably brought into pressure-contact with each other.

The pivot 8 has an enlarged head 8b at one end of the main shaft portion 8a, and a caulked shaft portion 8c provided at the other and having a diameter smaller than that of the main shaft portion 8a.

On the other hand, the bracket 7 is made of a steel plate and comprised of a pair of upper and lower arm plates 7b, 7b integrally connected to one end of a base plate 7a secured to the body B by a bolt 9. Large and small support bores 25 and 26 are provided in the arm plates 7b, 7b, respectively. The base end of the check plate 6 is inserted into between both the arm plates 7b, 7b; the main shaft portion 8a of the pivot 8 is press-fitted sequentially into the support bore 25 and the bearing bore 22; the caulked shaft portion 8c is fitted into the support bore 26; and an end of the caulked shaft portion 8c protruding outside the lower arm plate 7b is caulked in a state in which the enlarged head 8b is in abutment against an outer surface of the upper arm plate 7b.

In this manner, the opposite ends of the pivot 8 are secured to the bracket 7, and the check plate 6 is turnably supported by the main shaft portion 8a of the pivot 8.

The operation of this embodiment will be described below.

When the door D is opened from its fully-closed position, the shoes 16, 16 are slid on the opposite side faces of the cover member 6b in a thickness-increasing direction in response to the opening of the door D, whereby the rubber springs 17, 17 are compressed. Therefore, the clamping force of the shoes 16, 16 acting on the check plate 6 is increased by an increase in repulsive force of the rubber springs 17, 17, whereby the opening torque for the door D is increased moderately. When the door D is closed to a predetermined medium opening degree position and further turned to its fully-closed position, the shoes 16, 16 are brought into engagement with the first notches 10, 10 or the second notches 11, 11 with the repulsive forces of the rubber springs 17, 17, whereby the door D can be retained at the predetermined medium opening degree position or the fully-closed position by a force of such engagement.

In response to such opening motion or closing motion of the door D, the check plate 6 is turned about the pivot 8, and at the same time receives a load in a pulling direction or in a compressing direction by the sliding resistance between the shoes 16, 16 and the check plate 6. Such load is applied from the bearing portion 21 to the pivot 8.

The bearing bore 22 in the bearing portion 21 made of the synthetic resin and the main shaft portion 8a of the pivot 8 are in a mutual press-fit relationship to each other without any looseness therebetween, and hence the generation of an abnormal sound due to the load can be prevented. Moreover, the large numbers of press-contact portions 23 and gaps 24 are alternately disposed between the inner peripheral surface of the bearing bore 22 and the outer peripheral surface of the pivot 8 in the circumferential directions of them, and hence when a compressing force is applied to one of the pressure-contact portions 23, the gaps 24, 24 adjoining opposite sides of such a pressure-contact portion 23 permit the resilient deformation of the bearing portion 21 at the certain pressure-contact portion 23, whereby the shock of the load can be absorbed effectively to contribute to an enhancement in durability of each of the bearing portion 21, the pivot 8 and the bracket 7.

Moreover, it is possible to set the turning torque of the check plate 6 at a relatively small value, while forming by the provision of the gaps 24 the good pressure-contact portions 23 in virtue of a relatively small load for press-fitting the pivot 8 into the bearing bore 22. As a result, even when the door checker C is manually mounted to the body B and the door D of the automobile, the check plate 6 can be easily turned relative to the bracket 7, so that an enhancement in mounting workability can be provided. A special bush is not required and the structure is extremely simple, which can greatly contribute to a reduction in cost.

Particularly, if the bearing portion 21 having the bearing bore 22 is made of a synthetic resin, the resilient deformation of the press-contact portions 23 easily occurs to effectively achieve both a reduction in turning torque of the check plate 6 and elimination of the looseness from around the pivot 8.

If the bearing portion 21 made of the synthetic resin is integrally formed on the synthetic resin cover member 6b mold-coupled to the peripheral surface of the plate body 6a made of the steel material, and is brought into close contact with the inner peripheral surface of the through-bore 20 in the plate body 6a, the bearing portion 21 made of the synthetic resin can be reinforced by the plate body 6a, leading to an enhanced durability and a simple structure.

Figure 7:
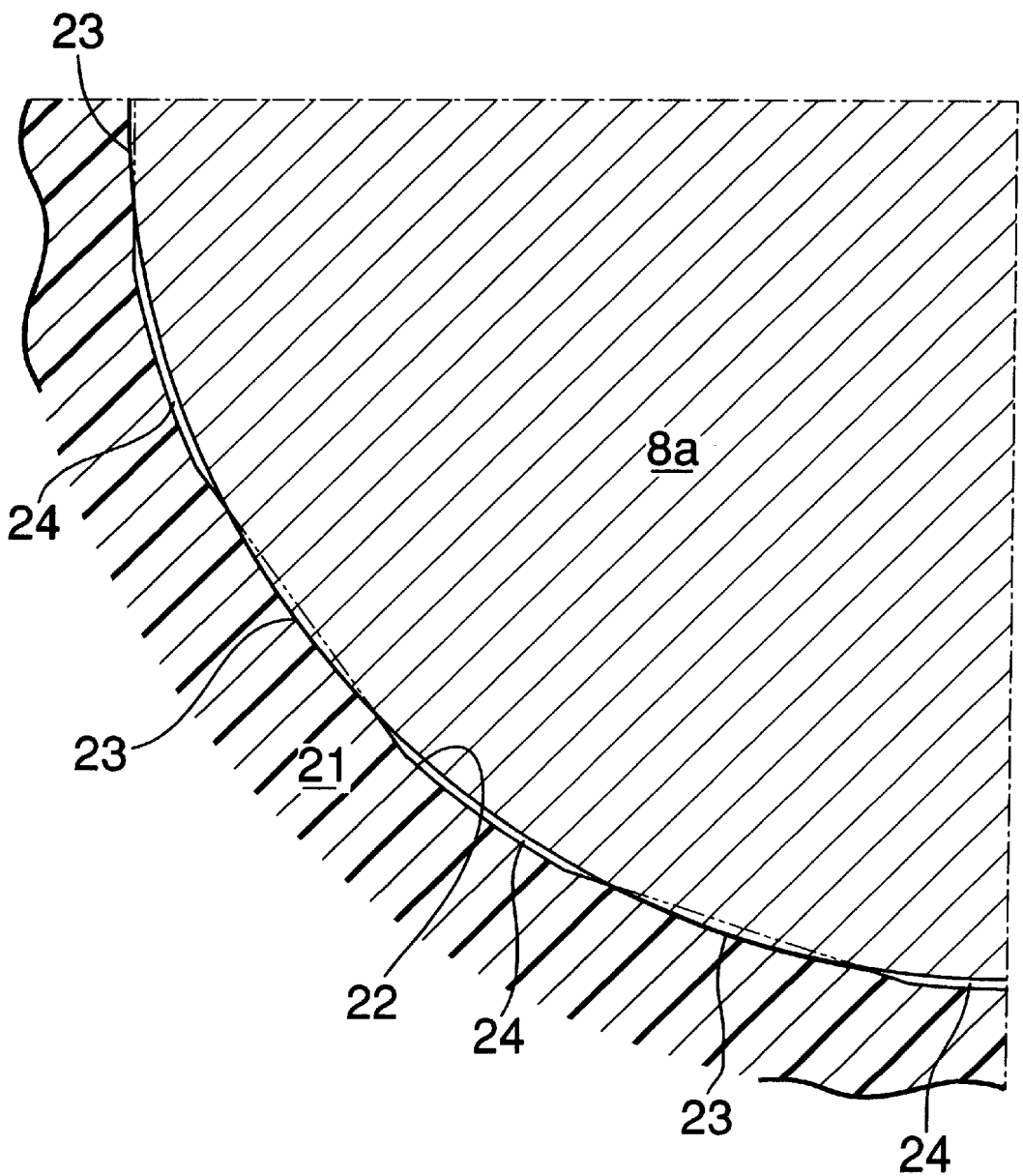
FIG. 7 is a sectional view similar to FIG. 6, but showing a modification to a bearing bore.

FIG. 7 shows a modification of the above-described bearing bore 22. In the modification, each corner formed on an inner peripheral surface of a bearing bore 22 to face each gap 24, is formed by an arcuate surface concentric with the bearing bore 22. This bearing bore 22 is basically not different from the above-described bearing bore 22 in respect of that it is of a polygonal shape. If the bearing bore 22 is formed into such a shape, the number of portions to be chamfered is reduced in making die blank of a circular-section shaft in connection with the manufacture of the forming die of the die bore 22.

The present invention is not limited to the above-described embodiment, and various modifications in design may be made without departing from the subject matter of the invention.

What is claimed is:

1. A structure for pivotally supporting a check plate of a door checker interposed between a door support and a door supported on said door support, said check plate being turnably supported on a bracket mounted to said door support, wherein a pivot secured to said bracket is relatively turnably press-fitted into a polygonal bearing bore defined in said check plate, and large numbers of pressure-contact portions and gaps are alternately arranged in circumferential directions thereof between an inner peripheral surface of said bearing bore and an outer peripheral surface of said pivot.

2. A structure for pivotally supporting a check plate of a door checker according to claim 1, wherein at least a bearing portion of said check plate, which defines said bearing bore, is made of a synthetic resin.

3. A structure for pivotally supporting a check plate of a door checker according to claim 2, wherein said check plate comprises a plate body made of a metal, and a cover member made of a synthetic resin and mold-coupled to said plate body to cover said plate body, and said bearing portion in close contact with an inner peripheral surface of a through-bore provided in said plate body is integrally connected to the cover member.

* * * * *